March 10, 1964  J. VON BONIN  3,123,894
METHOD OF PRODUCING A SOLID ELECTROLYTIC CAPACITOR
Filed Jan. 5, 1961
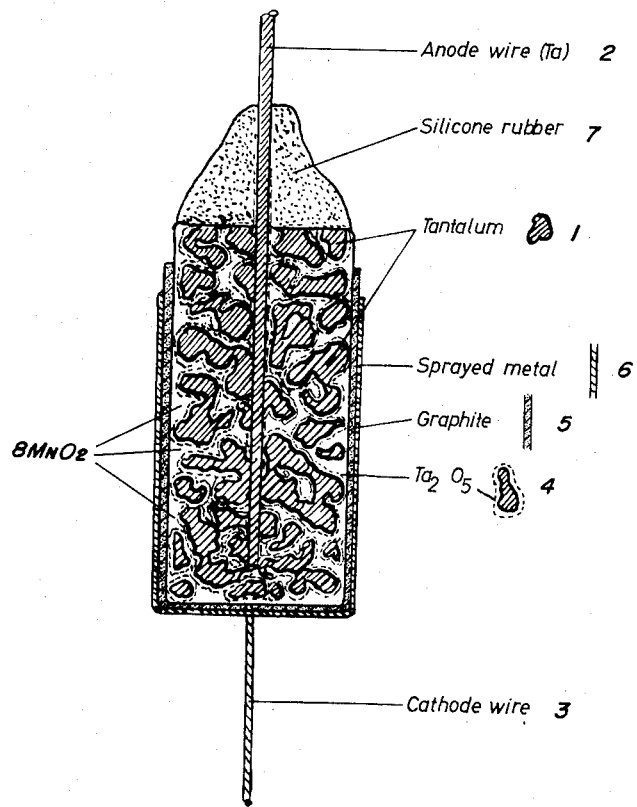
INVENTOR
JOCHEN VON BONIN
BY Robert Harding Jr.
ATTORNEY

United States Patent Office 3,123,894
Patented Mar. 10, 1964

3,123,894
METHOD OF PRODUCING A SOLID
ELECTROLYTIC CAPACITOR
Jochen von Bonin, Nurnberg, Germany, assignor to International Standard Electric Corporation, New York, N.Y., a corporation of Delaware
Filed Jan. 5, 1961, Ser. No. 80,880
Claims priority, application Germany Jan. 16, 1960
5 Claims. (Cl. 29—25.31)

The present invention relates to a method of producing a solid electrolytic capacitor. The tantalum capacitor, in which the anode body consists of a sintered tantalum powder and serves as a base for the layer or stacking structure consisting substantially of the dielectric layer, the semiconductor layer, and the connecting electrodes belongs to this group.

It has already been proposed, as disclosed in the application, Serial No. 769,396, filed October 24, 1958, issued as Patent No. 3,054,029, that this fundamental layer or stacking structure can be improved by employing intermediate layers, or the like. However, in connection with the invention to be described hereinafter, these layers do not require any further explanation, because the invention itself is aimed at producing the semiconductor layer of such capacitors, and to problems connected therewith.

Hitherto the semiconductor layer, particularly in solid electrolytic tantalum capacitors, provided with a semiconductor layer of manganese dioxide, was produced by impregnating the sinter body with an aqueous solution of manganese nitrate which was then thermally decomposed to give manganese dioxide. In order for the impregnation or saturation to be carried out in the course of the manufacturing process, the sinter body is dipped into the aqueous solution of manganese nitrate. Experience has shown that this method has substantial disadvantages which are the cause of a relatively high wastage during manufacture. One of these disadvantages resides in the fact that during the dipping of the sinter body into the manganese nitrate solution, even if the dipping is only performed up to a limited height, with a subsequently following thermal decomposition to give manganese dioxide, a shunt or even short-circuit between the lead-in to the sinter body (anode) and the semiconductor layer is difficult to avoid, because the sinter body, due to its porosity, absorbs the manganese-nitrate solution like a sponge, so that an insulating bridge between the anode lead-in and the semiconductor layer is either not obtained at all or only to a small extent.

It is one of the objects of this invention to provide a method of manufacturing solid electrolytic tantalum capacitors which will overcome the above disadvantages and provide a good insulation between the anode lead-in and the semiconductor layer.

Another object of the invention is to provide a method of making a semiconductor layer for a solid electrolytic capacitor by means of which the oxidizing step may be carried out at temperatures well below those which would destroy insulating lacquers.

The above-mentioned and other features and objects of this invention and the manner of attaining them will become more apparent and the invention itself will be best understood by reference to the following description of an embodiment of the invention taken in conjunction with the accompanying drawings, in which:

The single figure represents schematically a longitudinal cross section of a capacitor embodying the invention.

All considerations concerning a covering-up of a limited area between the lead-in to the sinter body (anode) and the semiconductor layer prior to its manufacture by means of an insulating layer, e.g. a layer of lacquer, lead to the fact that the terminal decomposition of the manganese nitrate necessitates a temperature of at least approximately 350° to 400° C. Since no lacquer is known which is capable of resisting such high temperatures, investigations along this line did not seem practical.

Further considerations led to the recognition that chemistry offers other possibilities for producing manganese dioxide from manganese-II-salts, which can be processed at substantially lower temperatures. The method chosen consists in starting in a known manner from a manganese-II-salt solution, such as manganese nitrate, and then first treating the nitrate with $NH_3$-gas, which separates out a gelatinous mass of manganese hydroxide or manganese oxide hydrate. By heating these compounds in a stream of oxygen, this gelatinous mass may be oxidized at a temperature of about 150° to 250° C., hence at a temperature ranging substantially below that of the conventional methods, to give manganese dioxide. Experiments have shown that it is possible to obtain, with the aid of this method, a firmly adhering and unobjectionable layer of dioxide.

On the other hand, the lower temperature which is required for this method according to the invention, now permits the insulation of the surroundings of the anode lead-in. According to a further feature of the invention, this insulation is effected by the application of a lacquer, or by sintering an insulating material onto the parts of the sinter body to be insulated, in particular upon the face side of the sinter body into the anode lead-in extends.

However, I have also discovered that not all types of lacquer or insulating material are suitable for serving the aforementioned purpose, but that these substances or materials must have certain inherent properties. The lacquer or the insulating material to be applied to the sinter body must not be porous after being hardened or applied by melting, and must be capable of closing the pores of the sinter body up to a restricted depth only, but up to this depth in a reliable and unobjectionable manner. The third property which the lacquer or the insulating material is required to have is the capability of repelling water. An insulating material meeting all of the above mentioned requirements is, for example, silicone rubber, which is applied in the form of a solution or emulsion and is then hardened by the application of heat.

The invention will now be described more specifically with reference to an exemplified embodiment.

A sintered tantalum body having an anode wire protruding therefrom was provided in accordance with the usual practice. The tantalum was then anodized in the usual manner by forming in acids. This causes a dielectric layer of tantalum oxide to be formed around the entire body of tantalum and the tantalum lead-in. A quantity of silicone rubber was then applied to the face of the sintered body around the anode wire forming a cone around the wire. The semiconducting layer was then formed in the following manner:

An aqueous solution of manganese-II-nitrate having a concentration of 40–50% was provided, and the anodized sintered tantalum body with the anode wire protruding was immersed therein. The nitrate solution was maintained at a temperature of 60–80° C. Thereafter the sintered body was exposed to a stream of ammonia. This produced a gelatinous mass of manganese-II-hydroxide or manganese-II-oxide hydrate surrounding the particles of anodized tantalum in the sintered mass. The tantalum body was then removed from the solution and heated in a stream of oxygen to a temperature of 180–250° C. for a period of ½–1 hour. This oxidized the manganese-II-hydroxide or manganese oxide to manganese dioxide ($MnO_2$).

A layer of graphite was then applied in the usual manner to the outer surface of the semiconductor away from the surface from which the anode wire protruded. Then a layer of sprayed metal was applied over the graphite and the cathode wire attached to this outer metal layer.

Raising the temperature in producing the semiconductor did not destroy the silicone rubber which remained as an insulator between the anode wire and the semiconductor.

The drawing represents a cross section of a completed capacitor with the sinter body of tantalum 1 provided with the anode and cathode electrode lead-in conductors 2 and 3, respectively. Inside the sinter body, as well as on the jacket surface thereof, and on the bottom face side of the sinter body the customary layer or stacking structure is provided consisting of the dielectric layer 4($Ta_2O_5$), the semiconductor layer 8($MnO_2$), and the connection electrode 5 of graphite. The cathode itself consists of a sprayed-on metal layer 6. According to the invention the area around the lead-in wire extending to the sinter body (anode) is covered with silicone rubber 7 which, in connection with the selected method of producing the manganese dioxide layer, produced on the dielectric layer $Ta_2O_5$, results in unobjectionable tantalum capacitors.

It is still within the scope of the present invention to cut off the upper portion of the applied lacquer cone, and to remove this portion subsequently to the production of the manganese dioxide layer, and then to expose a sufficient length of the anode wire for the further manufacturing processes.

What is claimed is:

1. The method of producing a solid electrolytic capacitor which comprises anodizing an anode body of tantalum having a lead attached thereto; coating the face of said body adjacent said lead and a portion of said lead with a coating of insulating material, and forming a semiconducting layer around said anodized body at a temperature under the melting point of said insulating material by immersing the body in a solution of manganese-II-salts, reacting said salts adjacent said body with ammonia gas, and oxidizing the resultant product in oxygen at 150° to 250° C., the insulating material being capable of resisting the heat at said temperatures.

2. The method, as defined in claim 1, in which the insulating material is elastic.

3. The method, as defined in claim 2, in which the insulating material is silicone rubber.

4. The method of producing a solid electrolytic capacitor which comprises anodizing a tantalum-anode body having a lead attached thereto, coating the face of said body adjacent said lead and said lead with an insulating material, immersing the thus coated body in a solution of manganese-II-nitrate maintained at a temperature of 60° to 80° C., thereafter exposing said body to a stream of ammonia gas to form a gelatinous mass of manganese-II-hydroxide or manganese-II-oxide hydrate around said body, removing said body from said solution, and heating said body in an oxidizing stream to a temperature and for a time sufficient to oxidize the manganese-II-hydroxide or oxide hydrate to manganese dioxide without destroying the insulating coating.

5. The method, as defined in claim 4, in which the insulating material is silicone rubber and the body is heated in the oxidizing stream to between 150° C. and 250° C.

References Cited in the file of this patent
UNITED STATES PATENTS
2,936,514    Millard _____ May 17, 1960